(12) United States Patent
Kuge

(10) Patent No.: US 9,965,091 B2
(45) Date of Patent: May 8, 2018

(54) MULTIPLE TOUCH DISPLAY DETECTION AND ARRANGEMENT

(71) Applicant: Sharp Kabushiki Kaisha, Sakai, Osaka (JP)

(72) Inventor: Yoichi Kuge, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 12 days.

(21) Appl. No.: 15/124,394

(22) PCT Filed: Feb. 19, 2015

(86) PCT No.: PCT/JP2015/054647
§ 371 (c)(1),
(2) Date: Sep. 8, 2016

(87) PCT Pub. No.: WO2015/137080
PCT Pub. Date: Sep. 17, 2015

(65) Prior Publication Data
US 2017/0017337 A1    Jan. 19, 2017

(30) Foreign Application Priority Data

Mar. 13, 2014   (JP) ................................. 2014-050613

(51) Int. Cl.
*G06F 3/041* (2006.01)
*G06F 3/044* (2006.01)

(52) U.S. Cl.
CPC ............ *G06F 3/0416* (2013.01); *G06F 3/041* (2013.01); *G06F 3/044* (2013.01)

(58) Field of Classification Search
None
See application file for complete search history.

(56) References Cited

U.S. PATENT DOCUMENTS

2012/0194456 A1*  8/2012  Fujii ..................... G06F 1/1624
                                                        345/173
2013/0257798 A1   10/2013  Tamura et al.

FOREIGN PATENT DOCUMENTS

JP         2013-229010 A    11/2013

* cited by examiner

*Primary Examiner* — Kenneth B Lee, Jr.
(74) *Attorney, Agent, or Firm* — Keating & Bennett, LLP

(57) ABSTRACT

Provided is a technique whereby, in an input device in which a plurality of touch panels are arranged so as to be adjacent to one another, even if an upper limit number of input operations on the touch panels as a whole is less than the total number of input operations, an input operation with respect to the touch panels as a whole can be determined according to frequencies of input operations. The input device detects contact positions corresponding to input operations detected at fixed time intervals on each of the touch panels arranged so as to be adjacent to one another, and outputs contact positions the number of which is less than the sum of the numbers of the input operations detectable during the fixed time interval on the respective touch panels. Based on the contact positions corresponding to the input operations detected at fixed time intervals, the input device specifies frequencies of the input operations with respect to the touch panels, and among the contact positions corresponding to the input operations detected at fixed time intervals, preferentially determines the contact position on the touch panel with a greater frequency of the input operation as a contact position to be output.

5 Claims, 13 Drawing Sheets

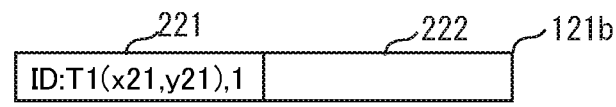
Fig. 7A
Fig. 7B
| Controller information | | Input ID |
|---|---|---|
| Controller No. | Controller ID | |
| P2 | 1 | T1 |
| P1 | 1 | T2 |
| | | |
Fig. 7C (a)

(b)

MULTIPLE TOUCH DISPLAY DETECTION AND ARRANGEMENT

TECHNICAL FIELD

The present invention relates to an input device, and a control program.

BACKGROUND ART

In recent years, display devices having a configuration in which a touch panel is stacked on a display panel have been in widespread use. Further, as the enlargement of the display panel is promoted, techniques for enlarging the touch panel are proposed.

JP-A-2013-229010 discloses a large-size touch panel having a plurality of detection areas. This touch panel detects a touch position in a detection area with use of controllers corresponding to the respective detection areas, and using the touch positions respectively detected by the controllers, calculates respective positions corresponding to the touch positions on the entire area of the touch panel.

SUMMARY OF THE INVENTION

In a case where a plurality of touch panels are arranged so as to be adjacent to one another, each touch panel detects contact positions the number of which is equal to the number of input operations detectable during a fixed time interval. For example, in a case where contact positions of at most two input operations can be detected in each touch panel during a fixed time interval, at most eight contact positions of input operations are detected on the touch panels as a whole. If the number of contact positions that can be output from the touch panels as a whole is a sum of the respective numbers of contact positions of input operations detectable by the respective touch panels (hereinafter this sum is referred to as the "total number of inputs"), the contact positions detected by the respective touch panels can be output. In a case where, however, the number of contact positions that can be output by the touch panels as a whole is smaller than the total number of inputs, contact positions to be output have to be determined from contact positions of input operations detected by each touch panel during a fixed period. Here, it is desirable that frequencies of input operations with respect to the plurality of touch panels are reflected.

The present invention provides techniques for outputting contact positions in such a manner that, among contact positions detected at fixed time intervals on each of a plurality of touch panels arranged so as to be adjacent to one another, a predetermined number of contact positions are output according to the frequency of the input operation, as contact positions on the touch panels as a whole.

An input device according to a first configuration outputs a predetermined number of contact positions, among contact positions corresponding to input operations detected at fixed time intervals on each of a plurality of touch panels arranged so as to be adjacent to one another, and the input device includes: a specification unit that, based on contact positions corresponding to the input operations detected at fixed time intervals, specifies frequencies of the input operations with respect to the touch panels; and a determination unit that, among the contact positions corresponding to the input operations detected at fixed time intervals, preferentially determines the contact position on the touch panel with a greater frequency of the input operations as a contact position to be output, wherein the predetermined number is less than a sum of respective numbers of the contact positions of the input operations detectable during the fixed time interval on the respective touch panels.

A second configuration is the first configuration that further includes a storage unit for storing the contact position to be output, wherein, based on the contact positions to be output stored in the storage unit, as to each of the touch panels, the specification unit counts the number of contact positions to be output on the touch panel, and the determination unit preferentially determines the contact position on the touch panel with a greater number of contact positions to be output, as the contact position to be output.

A third configuration is the first configuration wherein, based on the contact positions corresponding to the input operations detected at fixed time intervals, as to each of the touch panels, the specification unit counts the number of contact positions on the touch panel, and the determination unit preferentially determines the contact position on the touch panel with a greater number of contact positions, as the contact position to be output.

A fourth configuration is any one of the first to third configurations wherein, among the contact positions corresponding to the input operations detected during the fixed time interval, as to each of the touch panels, the determination unit determines the contact position to be output, according to the contact position corresponding to the input operation detected last.

A control program according to a fifth configuration is a control program that causes a computer of an input device that outputs a predetermined number of contact positions, among contact positions corresponding to input operations detected at fixed time intervals on each of a plurality of touch panels arranged so as to be adjacent to one another, to execute the steps of: based on contact positions corresponding the input operations detected at fixed time intervals, specifying frequencies of the input operations with respect to the touch panels; and, among the contact positions corresponding to the input operations detected at fixed time intervals, preferentially determining the contact position on the touch panel with a greater frequency of the input operations as a contact position to be output, wherein the predetermined number is less than a sum of respective numbers of the contact positions of the input operations detectable during the fixed time interval on the respective touch panels.

With the configuration, among contact positions detected at fixed time intervals from a plurality of touch panels arranged so as to be adjacent to one another, a predetermined number of contact positions according to frequencies of the input operations can be output as contact positions on the touch panels as a whole.

BRIEF DESCRIPTION OF DRAWINGS

FIG. 7A illustrates exemplary valid contact information stored in the OUT buffer in the example in FIG. 5B.

FIG. 7B illustrates exemplary valid contact information stored in the OUT buffer in the example illustrated in FIG. 5B.

FIG. 7C illustrates an exemplary ID correspondence table in the example illustrated in FIG. 5B.

MODE FOR CARRYING OUT THE INVENTION

Figure 1:
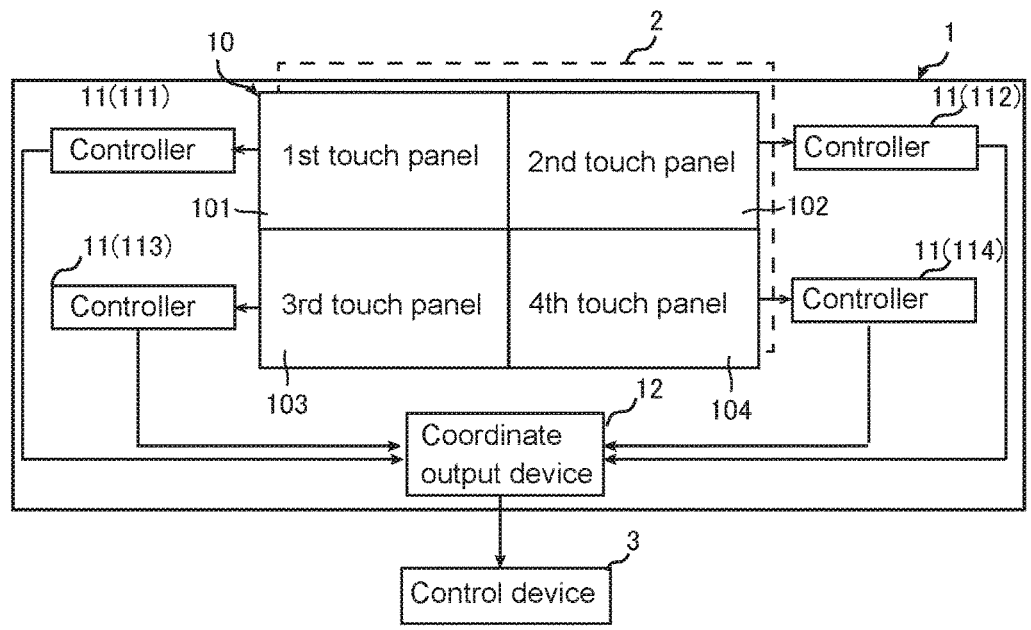
FIG. 1 is a block diagram illustrating a schematic configuration of an input device according to Embodiment 1.

An input device according to one embodiment outputs a predetermined number of contact positions, among contact positions corresponding to input operations detected at fixed time intervals on each of a plurality of touch panels arranged so as to be adjacent to one another, and the input device includes: a specification unit that, based on contact positions corresponding to the input operations detected at fixed time intervals, specifies frequencies of the input operations with respect to the touch panels; and a determination unit that, among the contact positions corresponding to the input operations detected at fixed time intervals, preferentially determines the contact position on the touch panel with a greater frequency of the input operations as a contact position to be output, wherein the predetermined number is less than a sum of respective numbers of the contact positions of the input operations detectable during the fixed time interval on the respective touch panels (the first configuration).

According to the first configuration, among contact positions corresponding to input operations detected at fixed time intervals on a plurality of touch panels, contact positions the number of which is less than a sum of the numbers of contact positions of input operations that the respective touch panels can detect during a fixed time interval are output. Among contact positions corresponding to input operations detected at fixed time intervals, a contact position on the touch panel with a greater frequency of the input operations is preferentially determined as the contact position to be output. This makes it possible to output a contact position to which the frequencies of the input operations are reflected, as a contact position on the touch panels as a whole.

The second configuration may be the first configuration that further includes a storage unit configured to store the contact position to be output, wherein, based on the contact positions to be output stored in the storage unit, as to each of the touch panels, the specification unit counts the number of contact positions to be output on the touch panel, and the determination unit preferentially determines the contact position on the touch panel with a greater number of contact positions to be output, as the contact position to be output.

According to the second configuration, the contact position on the touch panel with a greater number of contact positions to be output stored in the storage unit is preferentially determined as the contact position to be output. This makes it possible to preferentially output a contact position on the touch panel that has been more frequently determined in the past as a contact position to be output, as a contact position on the touch panels as a whole.

The third configuration may be the first configuration wherein, based on the contact positions corresponding to the input operations detected at fixed time intervals, as to each of the touch panels, the specification unit counts the number of contact positions on the touch panel, and the determination unit preferentially determines the contact position on the touch panel with a greater number of contact positions, as the contact position to be output.

According to the third configuration, the contact position of the touch panel on which a greater number of contact positions are detected during the fixed time interval is preferentially determined as a contact position to be output. This makes it possible to preferentially output the contact position of the touch panel with a greater frequency of current input operations, as a contact position on the touch panels as a whole.

The fourth configuration may be any one of the first to third configurations wherein, among the contact positions corresponding to the input operations detected during the fixed time interval, as to each of the touch panels, the determination unit determines the contact position to be output, according to the contact position corresponding to the input operation detected last.

With the fourth configuration, the contact position corresponding to the input operation detected last on each touch panel can be determined as a contact position to be output.

A control program according to one embodiment of the present invention causes a computer of an input device that outputs a predetermined number of contact positions, among contact positions corresponding to input operations detected at fixed time intervals on each of a plurality of touch panels arranged so as to be adjacent to one another, to execute the steps of: based on contact positions corresponding the input operations detected at fixed time intervals, specifying frequencies of the input operations with respect to the touch panels; and, among the contact positions corresponding to the input operations detected at fixed time intervals, preferentially determining the contact position on the touch panel with a greater frequency of the input operation as a contact position to be output, wherein the predetermined number is less than a sum of respective numbers of the contact positions of the input operations detectable during the fixed time interval on the respective touch panels (the fifth configuration).

The following description describes embodiments of the present invention in detail while referring to the drawings. In the drawings, identical or equivalent parts are denoted by the same reference numerals, and descriptions of the same are not repeated.

Embodiment 1

(Configuration)

FIG. 1 is a block diagram illustrating a schematic configuration of an input device according to the present embodiment. The input device 1 includes a touch panel 10, controllers 111 to 114, and a coordinate output device 12. Hereinafter, when the controllers 111 to 114 are not distinguished particularly, they are referred to as the controllers 11. The input device 1 has such a configuration that the touch panel 10 is arranged on a display panel 2 such as a liquid crystal panel. The input device 1 is connected to a control device 3 provided outside the input device 1. The input device 1 outputs coordinates on the touch panel 10 to the control device 3, and an image according to the coordinates is displayed on the display panel 2 by the control device 3.

The touch panel 10 includes a first touch panel 101, a second touch panel 102, a third touch panel 103, and a fourth touch panel 104 that have respective sensing areas that are independent from one another. The first touch panel 101, the second touch panel 102, the third touch panel 103, and the fourth touch panel 104 are arranged so as to be adjacent to one another. Hereinafter, the first touch panel 101, the second touch panel 102, the third touch panel 103, and the fourth touch panel 104 are referred to as touch panels 100 when they are not distinguished particularly.

The touch panel 10 is provided on the display panel 2 in such a manner that the sensing areas of the first touch panel 101, the second touch panel 102, the third touch panel 103, and the fourth touch panel 104 entirely overlap the display region of the display panel 2.

The first touch panel 101 is connected with the controller 111, and the second touch panel 102 is connected with the controller 112. Likewise, the third touch panel 103 is connected with the controller 113, and the fourth touch panel 104 is connected with the controller 114.

The touch panels 100 are, for example, electrostatic capacitance touch panels. The touch panels 100 include a group of drive electrodes (not shown) and a group of sense electrodes (not shown) that are arranged in matrix. The sensing area of the touch panels 100 is formed with the drive electrode group and the sense electrode group.

In the touch panels 100, the drive electrode group is sequentially scanned by the control of the corresponding controllers 11, and a signal indicative of an electrostatic capacitance is output from the sense electrode group.

In the present embodiment, the touch panel 100 is a touch panel of a multi-touch system, and is capable of detecting at most two input operations. The controllers 11 sequentially output a scanning signal to the drive electrodes on the touch panel 100 according to a predetermined operation frequency. In a case where a signal value output from the sense electrode is equal to or greater than a threshold value, the controllers 11 detect an input operation on the touch panel 100. The controllers 11 detect coordinates corresponding to an intersection position between the drive electrode and the sense electrode at which the signal value is obtained, as a contact position corresponding to the detect input operation. The coordinates of this contact position are coordinates on a coordinate plane preliminarily set on the touch panel 100.

Further, an input operation from when a finger comes into contact with the corresponding touch panel 100 until the finger leaves the same is assumed to be an operation unit, and the controllers 11 detect a state of contact per input operation, together with a contact position. The state of contact is either one of a state in which a finger is brought into contact with the touch panels 100 for the first time, a state in which the finger continuously remains in contact with the touch panels 100, and a state in which the finger is separated from the touch panels 100.

The controllers 11 output contact information that contains a contact position on the touch panels 100 per input operation, status information that indicates a state of contact, and controller information, to the coordinate output device 12 at fixed time intervals. The status information contains either one of a touch start information that indicates the start of contact of a finger, hold information that indicates that the contact remains continuing, and release information that indicates that the finger has left the touch panels 100. The controller information contains a controller No. for identifying the controller 11, an ID (hereinafter referred to as a controller ID) for identifying an input operation on the touch panels 100.

For example, in a case where an operation of sliding a finger in a state where the finger is in contact with the touch panels 100 is performed, the controllers 11 output contact information that contains coordinates of the position of the first contact of the finger, a flag of "1" indicating the touch start information, and controller information. Subsequently, the controllers 11 output contact information that contains coordinates of the contact position while the finger is sliding, a flag of "10" indicating the hold information, and controller information. Then, when the finger leaves the touch panels 100, the controllers 11 output contact information that contains coordinates of the contact position when the finger leaves, a flag of "0" indicating release information, and controller information. It should be noted that the above-described flags indicating the touch start information, the hold information, and the release information, respectively, are merely examples, and they may be any information that enables identification of contact states in the input operations.

Figure 2:
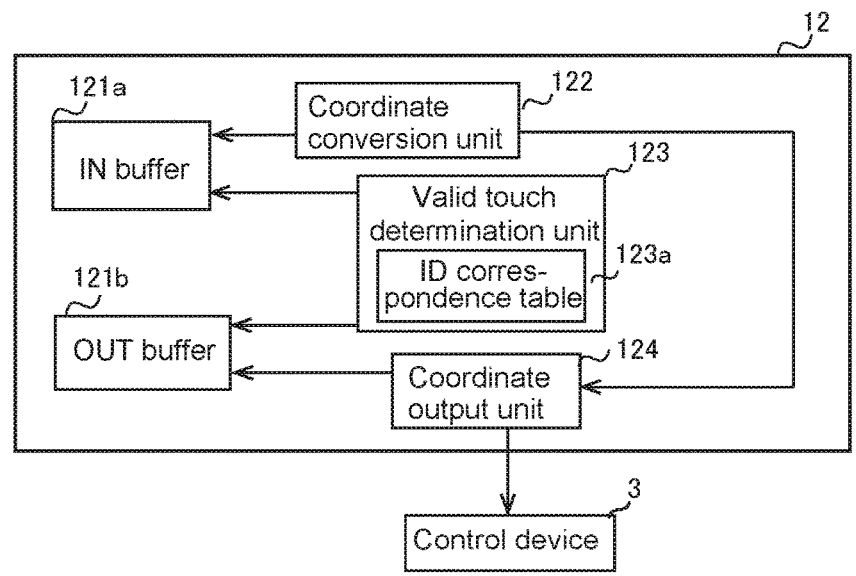
FIG. 2 is a functional block diagram of a coordinate output device illustrated in FIG. 1.

The coordinate output device 12 includes a central processing unit (CPU), and memories (a read only memory (ROM) and a random access memory (RAM)), which are not illustrated in the drawings. FIG. 2 is a functional block diagram of the coordinate output device 12. The coordinate output device 12 executes a control program that the CPU stores in the ROM, thereby realizing the functions in the respective parts illustrated in FIG. 2. More specifically, the coordinate output device 12 specifies a frequency of input operations with respect to the touch panel 10, based on the contact information output from the controllers 111 to 114. Then, the coordinate output device 12 determines a contact position of a detected input operation on the touch panel 10 (hereinafter referred to as a "valid contact position"), that is, a contact position to be output to the control device 3 (contact position to be output), according to frequencies of the input operations, from among pieces of contact information that are output from the controllers 111 to 114 during every fixed time interval. Further, the coordinate output device 12 outputs the coordinates on the touch panel 10 corresponding to the valid contact position, to the control device 3.

In the present embodiment, the numbers of pieces of contact information that are output at fixed time intervals are counted as to the respective controllers 11, as a frequency of input operations with respect to the touch panel 10. Contact positions on the touch panel corresponding to the controller 11 with the greatest number of pieces of contact information are determined as valid contact positions preferentially.

The upper limit number of valid contact positions that can be output to the control device 3 is less than a sum of the respective numbers of contact positions of input operations detectable by the first to fourth touch panels 101 to 104 (hereinafter this number is referred to as a total number of inputs). In the example of the present embodiment, contact positions corresponding to two input operations can be detected on the touch panels 100 at fixed time intervals, and hence, the upper limit number of valid contact positions that can be output is set to 2. Hereinafter, each part of the coordinate output device 12 is described.

In FIG. 2, the coordinate output device 12 includes an IN buffer 121a and an OUT buffer 121b, a coordinate conversion unit 122, a valid touch determination unit 123, as well as a coordinate output unit 124. Hereinafter, each part is described.

Figure 3A:
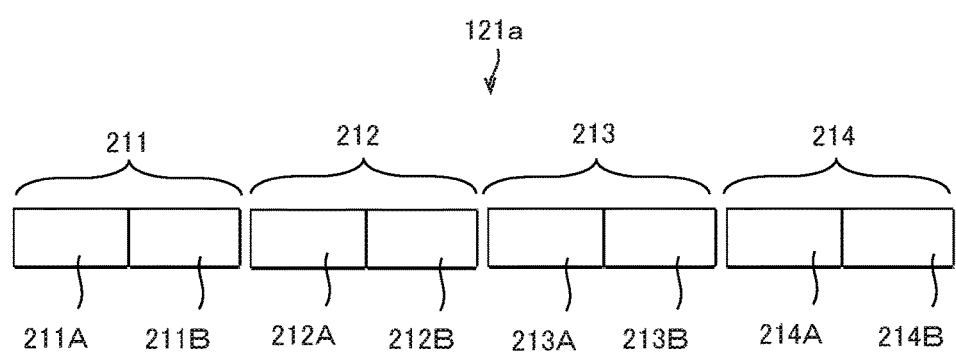
FIG. 3A is a schematic diagram illustrating an exemplary configuration of an IN buffer illustrated in FIG. 1.

FIG. 3A is a schematic diagram illustrating an exemplary configuration of the IN buffer 121a. As illustrated in FIG. 3A, the IN buffer 121a includes buffer areas 211 to 214 that correspond to the controllers 111 to 114, respectively. As described above, in the present embodiment, at most two input operations can be detected on the touch panels 100. Each of the buffer areas 211 to 214 have two areas for storing two pieces of contact information corresponding to two input operations, respectively. To the buffer areas 211 to 214, contact information is input by the controllers 11 corresponding thereto, respectively, at fixed time intervals, whereby the buffer areas 211 t 214 are updated.

Figure 3B:
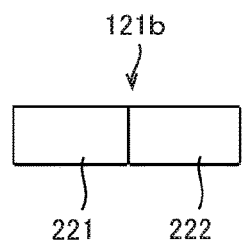
FIG. 3B is a schematic diagram illustrating an exemplary configuration of an OUT buffer illustrated in FIG. 1.

Next, the OUT buffer 121b is described. FIG. 3B is a schematic diagram illustrating an exemplary configuration of the OUT buffer 121b. The OUT buffer 121b includes two areas 221 and 222. The areas 221, 222 store valid contact information that contains valid contact position determined by the valid touch determination unit 123, which is to be described below, an ID corresponding to the contact position, the ID being for identifying an input operation on the touch panel 10 (hereinafter referred to as an input ID), and status information.

The coordinate conversion unit 122 converts the contact position of each piece of contact information stored in the IN buffer 121a into coordinates on a coordinate plane that is preliminarily set with respect to the touch panel 10 (the coordinates are hereinafter referred to as "synthesized coordinates"), which are thereafter stored in the RAM.

Referring to the IN buffer 121a at predetermined time intervals, the valid touch determination unit 123 detects the number of pieces of contact information per controller 11, preferentially refers to contact information of the touch panel 100 corresponding to the controller 11 with a greater number of pieces of contact information, and determines valid contact positions so that the number of valid contact positions is equal to or smaller than the upper limit number of valid contact positions that can be output (hereinafter this operation is referred to as a valid touch determination operation). The valid touch determination unit 123 inputs, to the OUT buffer 121b, valid contact information that contains the determined valid contact position, the input ID, and status information contained in contact information that contains the contact position. The valid touch determination unit 123 includes an ID correspondence table 123a. The ID correspondence table 123a stores the input ID corresponding to the valid contact position, and controller information corresponding to this valid contact position, in correspondence with each other. The valid touch determination unit 123 updates the ID correspondence table 123a for every valid touch determination operation.

The coordinate output unit 124 reads the valid contact information that is input to the OUT buffer 121b, at predetermined time intervals, and outputs, to the control device 3, input information that contains synthesized coordinates corresponding to the contact position contained in the valid contact information, as well as an input ID and status information contained in the valid contact information.

(Operation Example)

Figure 4:
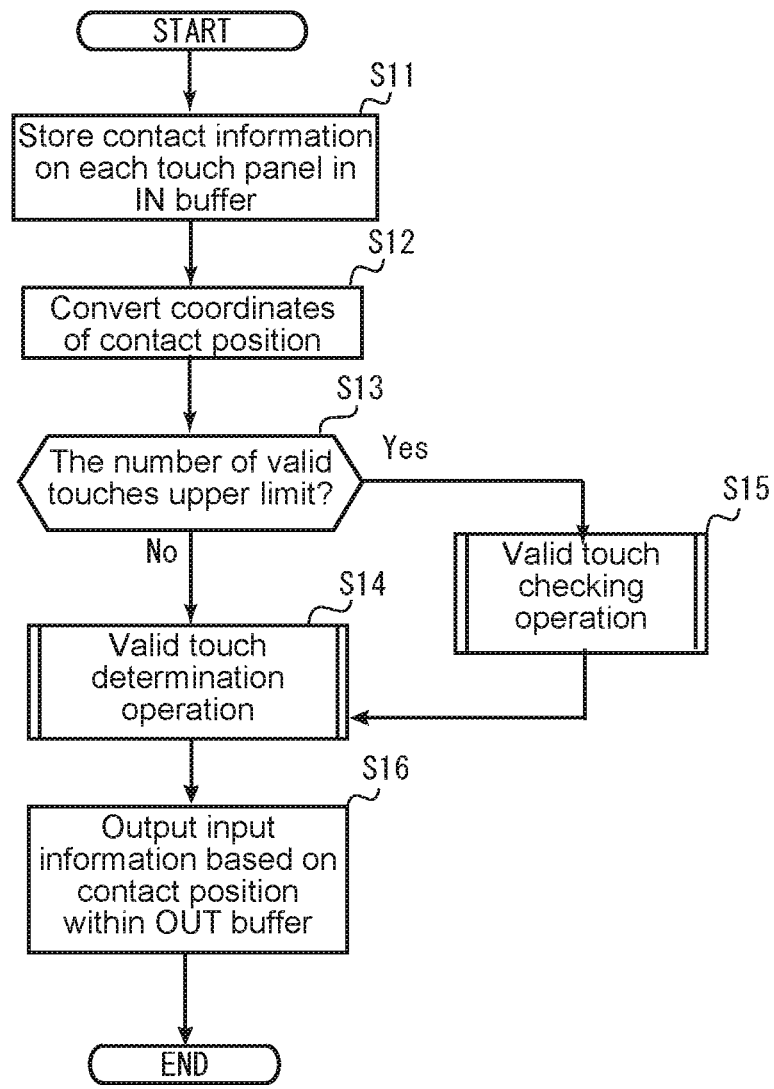
FIG. 4 illustrates a flowchart of an exemplary operation of the input device according to Embodiment 1.

Next, an operation example of the input device 1 is described. FIG. 4 illustrates an operation flow of the input device 1.

The input device 1, using the controllers 111 to 114, detects input operations on the first to fourth touch panels 101 to 104 at fixed time intervals, and stores contact information corresponding to the detected input operations in the IN buffer 121a (Step S11).

Figure 5A:
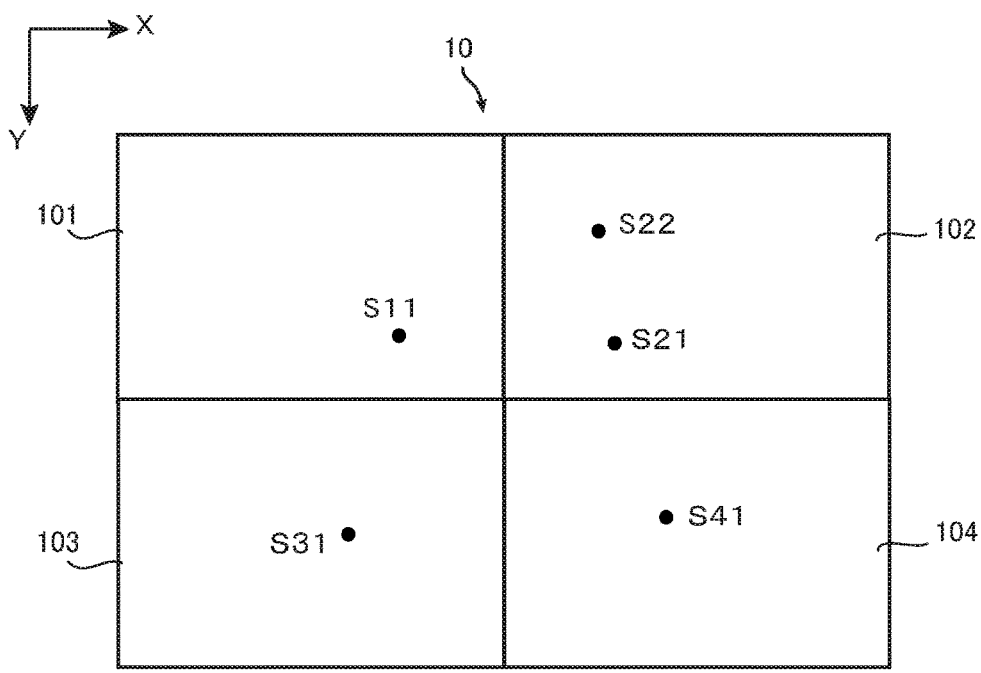
FIG. 5A is a schematic diagram illustrating exemplary contact positions in Embodiment 1.

For example, as illustrated in FIG. 5A, when a finger comes into contact with a contact position S11 on the first touch panel 101, contact positions S21 and S22 on the second touch panel 102, a contact position S31 on the third touch panel 103, and a contact position S41 on the fourth touch panel 104 for the first time, the controllers 11 corresponding to the touch panels, respectively, output contact information corresponding to these contact positions to the IN buffer 121a.

Figure 5B:
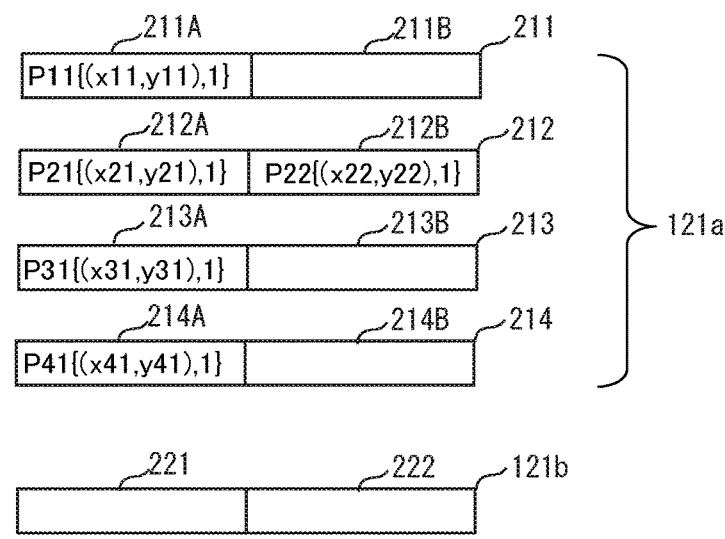
FIG. 5B is a schematic diagram illustrating an IN buffer and an OUT buffer corresponding to the contact positions illustrated in FIG. 5A.

FIG. 5B illustrates an exemplary state in which pieces of contact information corresponding to the respective contact positions illustrated in FIG. 5A are stored in the IN buffer 121a. As illustrated in FIG. 5B, contact information of "P11{(x11, y11), 1}" corresponding to the contact position S11 is stored in an area 211A of the buffer area 211. The contact information of "P11{(x11, y11), 1}" contains controller information of "P11", coordinates of (x11, y11) corresponding to the contact position S11 on the first touch panel 101, and touch start information (=1). The controller information of "P11" contains a controller No. of "P1" corresponding to the controller 111, a controller ID of "1" for identifying the input operation on the touch panel 101.

Contact information of "P21{(x21, y21), 1}" corresponding to the contact position S21 is stored in an area 212A of the buffer area 212, and contact information of "P22{(x22, y22), 1}" corresponding to the contact position S22 is stored in the area 212B of the same. The contact information of "P21{(x21, y21), 1}" contains controller information of "P21", coordinates of (x21, y21) corresponding to contact position S21 on the second touch panel 102, and touch start information of "1". The controller information of "P21" contains a controller No. of "P2" corresponding to the controller 112, and a controller ID of "1" for identifying the input operation on the touch panel 102.

The contact information of "P22{(x22, y22), 1}" contains controller information of "P22", coordinates of (x22, y22) corresponding to the contact position S22 on the second touch panel 102, and touch start information of "1". The controller information of "P22" contains a controller No. of "P2" corresponding to the controller 112, and a controller ID of "2" for identifying an input operation on the touch panel 102.

Contact information of "P31{(x31, y31), 1}" corresponding to the contact position S31 is stored in an area 213A of the buffer area 213. The contact information of "P31{(x31, y31), 1}" contains controller information of "P31", coordinates of (x31, y31) corresponding to the contact position S31 on the third touch panel 103, and touch start information of "1". The controller information of "P31" contains a controller No. of "P3" corresponding to the controller 113, and a controller ID of "1" for identifying an input operation on the touch panel 103.

Contact information of "P41{(x41, y41), 1}" corresponding to the contact position S41 is stored in an area 214A of the buffer area 214. The contact information of "P41{(x41, y41), 1}" contains controller information of "P41", coordinates (x41, y41) corresponding to the contact position S41 on the fourth touch panel 104, and touch start information of "1". The controller information of "P41" contains a controller No. of "P4" corresponding to the controller 114, and a controller ID of "1" for identifying an input operation on the touch panel 104.

The above-described controller Nos. and controller IDs are merely examples, and they may be any pieces of information as long as the touch panels and the input operations are identified by the pieces of information, respectively.

As illustrated in FIG. 4 again, the input device 1 converts the contact position contained in the contact information stored in the IN buffer 121a into synthesized coordinates on the coordinate plane of the touch panel 10 (Step S12).

In a case where the number of valid touches is not the upper limit number, that is, in a case where valid contact information that contains a valid contact position that can be output is not stored in the areas 221, 222 of the OUT buffer 121b (Step S13: No), the input device 1 performs a valid touch determination operation (Step S14).

Figure 6:
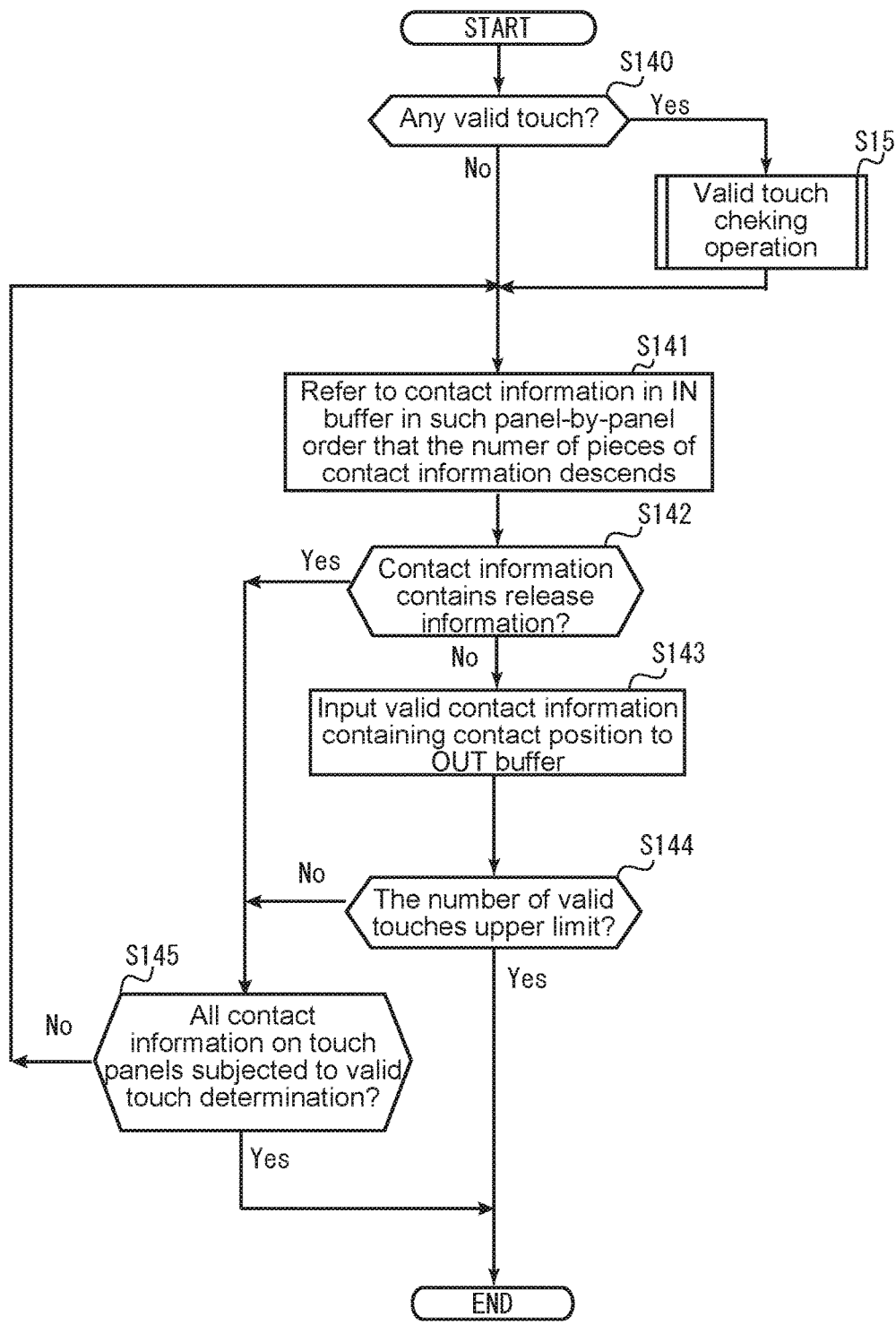
FIG. 6 is a flowchart illustrating the valid touch determination operation illustrated in FIG. 4.

Here, the valid touch determination operation in the present embodiment is described with reference to the operation flow illustrated in FIG. 6. In a case where valid contact information is stored in none of the areas of the OUT buffer 121b (Step S140: No), the input device 1 detects the number of pieces of contact information per touch panel in the IN buffer 121a, and refers to contact information of the touch panels, in such an order that the number of pieces of the contact information on the touch panel descends (Step S141).

The state in the example illustrated in FIG. 5B is a state in which a valid contact position is not determined. In this example, contact information containing contact a position on the second touch panel 102 is stored in the buffer area 212. In the buffer areas 211, 213, and 214, pieces of contact information containing contact positions on the first touch panel 101, the third touch panel 103, and the fourth touch panel 104 are stored, respectively. In this example, therefore, the contact information on the second touch panel 102 is referred to first. The same number of pieces of contact information are stored in each of the buffer areas 211, 213, and 214. In the present embodiment, therefore, in a case where the numbers of pieces of contact information are equal to one another, the contact information of the touch panels is referred to in a preliminarily determined order. The preliminarily determined order is, for example, an order of the first touch panel 101, the second touch panel 102, the third touch panel 103, and the fourth touch panel 104. In the example illustrated in FIG. 5B, therefore, after the second touch panel 102 is referred to, the first touch panel 101 is referred to preferentially.

In a case where release information is not contained in contact information referred to (Step S142: No), that is, in a case where the touch start information of "1" or hold information of "10" is contained therein, the input device 1 determines the contact position in the contact information as a valid contact position. Then, the input device 1 applies a new input ID indicating an input operation on the touch panel 10 to the contact position, and outputs valid contact information containing the touch start information of "1" to the area 221 as one of the areas in the OUT buffer 121b. Further, the input device 1 stores controller information corresponding to the valid contact position, and the newly applied input ID, in correspondence with each other in the ID correspondence table 123a (Step S143).

In the examples in FIG. 5B, contact information is stored in the buffer area 212 corresponding to the second touch panel 102, which is referred to first. In a case where pieces of contact information are stored in two areas, respectively, if pieces of status information respectively contained in the pieces of contact information are identical to each other, the input device 1 refers to one of the areas that is preliminarily determined. If the pieces of status information are different, that is, if the pieces of status information in the two pieces of contact information are touch start information and hold information, respectively, the input device 1 refers to the contact information in which the touch start information is contained. The contact information in which the touch start information is contained is contact information corresponding to an input operation detected after the contact information in which the hold information is contained. In other words, in a case where a plurality of contact positions are detected during a fixed time interval on the touch panels 100, a contact position corresponding to an input operation that is detected at the last detection timing is selected, among a plurality of input operations respectively corresponding to a plurality of contact positions. By preferentially referring to contact information corresponding to the detected input operation detected last, a valid contact position in conformity with the current input operation can be determined.

In the example in FIG. 5B, touch start information of "1" is contained in both of the pieces of contact information in the areas 212A, 212B of the buffer area 212. In this example, therefore, the area 212A is preferentially referred to as is determined preliminarily, and the contact position of (x21, y21) is determined as a valid contact position. Consequently, as illustrated in FIG. 7A, in the buffer area 221 in the OUT buffer 121b, valid contact information in which a new input ID of "T1" is applied to the contact position of (x21, y21) and touch start information of "1" is contained is stored.

The following description refers to FIG. 6 again. In a case where the number of valid touches is not the upper limit number (Step S144: No), if the operation at the steps S141 to S143 (valid touch determination operation) have not been completed as to the pieces of contact information with respect to all of the touch panels (Step S145: Yes), the input device 1 repeats the operation of step S141 and subsequent steps.

In the example illustrated in FIG. 5B, no valid contact information is stored in the area 222 of the OUT buffer 121b. The input device 1 therefore subsequently refers to the buffer area 211 corresponding to the first touch panel 101, and carries out the operations at Steps S142 and S143. As illustrated in FIG. 7B, in the area 222 of the OUT buffer 121b, valid contact information in which an input ID of "T2", which is different from that for the contact position S21, is applied to the contact position of (X11, y11) stored in the buffer area 211A, and touch start information of "1" is contained, is stored.

Through the above-described operation, as illustrated in FIG. 7C, in the ID correspondence table 123a, the controller information of "P21" corresponding to the contact position of (x21, y21) and the input ID of "T1" are stored in correspondence with each other, and the controller information of "P11" corresponding to the contact position of (x11, y11) and the input ID of "T2" are stored in correspondence with each other.

In a case where contact information that is referred to at Step S142 contains release information (Step S142: Yes), the above-described operation at Step S145 is carried out. Since the contact position of the contact information containing release information is a position at which the contact with the touch panel 100 stopped, the contact position is not determined as a valid contact position.

The following description refers to FIG. 6 again. In a case where valid contact information is stored in the areas 221, 222 of the OUT buffer 121b, that is, in a case where the number of valid touches is equal to the upper limit number (Step S144: Yes), the input device 1 ends the valid touch determination operation (Step S14).

It should be noted that in a case where, at Step S140, valid contact information is stored in at least one of the areas of the OUT buffer 121b (Step S140: Yes), the input device 1 performs a valid touch checking operation, which is described below (Step S15).

The following description refers to FIG. 4 again. After the valid touch determination operation at Step S14, the input device 1 reads, from the RAM, synthesized coordinates corresponding to the contact position contained in the valid contact information stored in the areas 221 and 222 of the OUT buffer 121b. The input device 1 outputs the input information containing the synthesized coordinates, and the ID as well as the status information contained in the valid contact information, to the control device 3.

In a case where, at Step S13, the number of the valid touches is equal to the upper limit number (Step S13: Yes), in other words, in a case where two pieces of valid contact information are stored in the OUT buffer 121b, the input device 1 carries out the valid touch checking operation as to the valid contact information (Step S15). Hereinafter, in the example illustrated in FIG. 5A, it is assumed that the contact with the second touch panel 102 at the contact position S21 stops, and a transition is made to the state illustrated in FIG. 8. With reference to this example, the following description describes the valid touch checking operation in the present embodiment.

Figure 9:
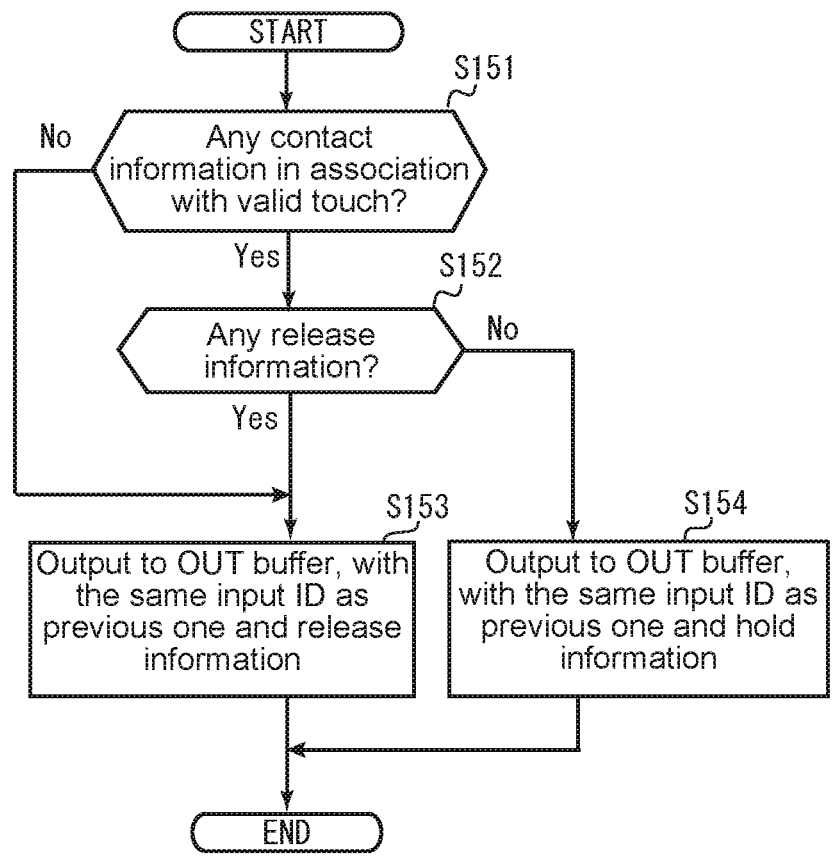
FIG. 9 is a flowchart illustrating the valid touch checking operation illustrated in FIGS. 4 and 6.

FIG. 9 illustrates an operation flow of the valid touch checking operation. The input device 1 refers to the ID correspondence table 123a, and determines whether or not contact information in association with the valid contact information stored in the OUT buffer 121b is stored in the IN buffer 121a (Step S151).

In a case where contact information in association with the valid contact information is stored, that is, in a case where contact information containing controller information corresponding to the input ID contained in the valid contact information is stored in the IN buffer 121a (Step S151: Yes), the input device 1 determines whether or not release information is contained in the contact information (Step S152).

In a case where release information is contained in the contact information (Step S152: Yes), the input device 1 updates the valid contact information based on the contact information (Step S153).

Figure 8A:
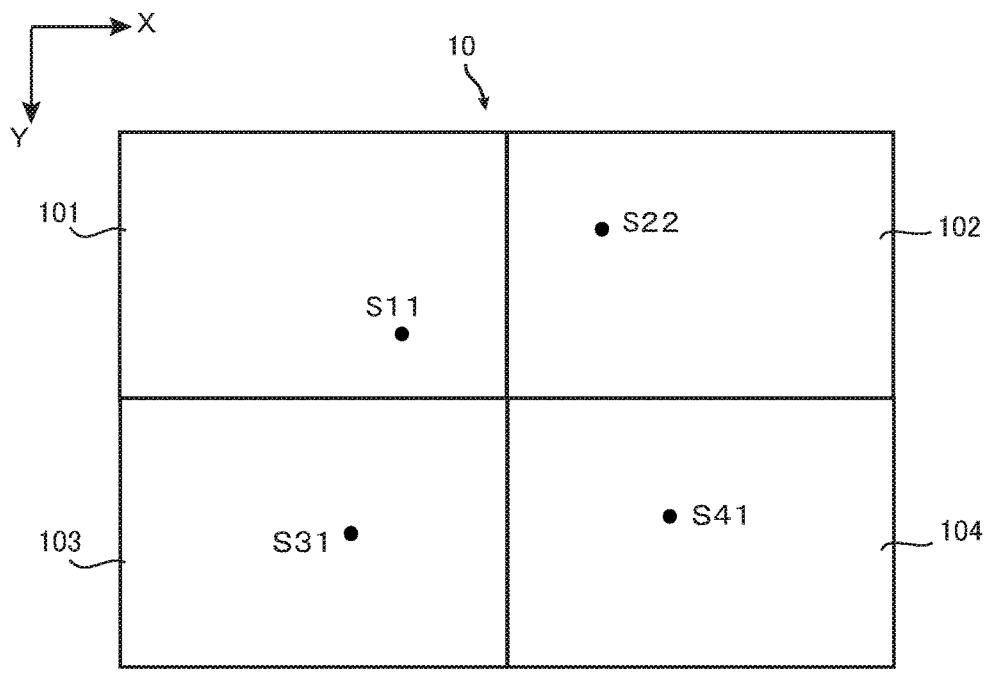
FIG. 8A is a schematic diagram illustrating exemplary contact positions in Embodiment 1.
Figure 8B:
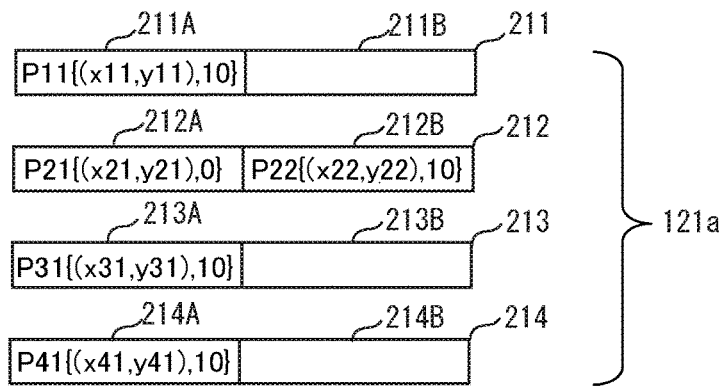
FIG. 8B is a schematic diagram illustrating an IN buffer corresponding to the contact positions illustrated in FIG. 8A.

In a case where the contact with the second touch panel 102 at the contact position S21 illustrated in FIG. 5A stops and a transition is made to the state in FIG. 8A, the IN buffer 121a is updated from the state illustrated in FIG. 5B to the state illustrated in FIG. 8B. In other words, the status information of the contact information corresponding to the contact position S21 in the buffer area 212A is updated to release information of "0", the status information of the contact information in the buffer areas 211A, 212B, 213A, and 214 is updated to the hold information of "10".

The valid contact information stored in the area 221 of the OUT buffer 121b illustrated in FIG. 7B contains the input ID of "T1". In the area 212A of the buffer area 212 illustrated in FIG. 8B, contact information containing controller information of "P21" corresponding to the input ID of "T1" is stored. Since release information is contained in the contact information, valid contact information containing the coordinates of (x21, y21) of the contact position S21, the same input ID of "T1" as that at a previous time, and the release information of "0", is stored in the area 221 of the OUT buffer 121b.

The following description refers to FIG. 9 again. In a case where, at Step S152, the contact information does not contain release information (Step S152: No), that is, in a case where hold information is contained, the input device 1 updates the valid contact information to one that contains the contact position, the same input ID as that at the previous time, and the same hold information (Step S154).

Figure 8C:
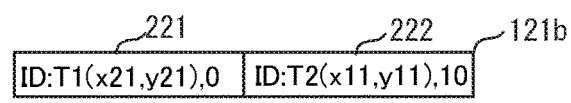
FIG. 8C illustrates exemplary valid contact positions stored in an OUT buffer in the example illustrated in FIG. 8B.

In the valid contact information stored in the area 222 of the OUT buffer 121b illustrated in FIG. 7B, the input ID of "T2" is contained. In the example in FIG. 8B, the controller information of "P11" corresponding to the input ID of "T2" is stored in the area 211A of the buffer area 211. Since hold information is contained in this contact information, valid contact information containing the coordinates of (x11, y11) of the contact position S11 as well as the input ID of "T2" and the hold information of "10" is stored in the area 222 of the OUT buffer 121b. This allows pieces of contact information corresponding to the contact positions S21 and S11 to be stored in the areas 221 and 222 of the OUT buffer 121b, respectively, as illustrated in FIG. 8C.

The following description refers to FIG. 9 again. In a case where, at Step S151, no valid contact information is stored in the IN buffer 121a (Step S151: No), the input device 1 carries out the operation at Step S153. The IN buffer 121a is updated by contact information input from each controller 11 at fixed time intervals. At the timing when each area in the IN buffer 121a is referred to, therefore, in some cases, the input operation corresponding to the valid contact position has ended already, and contact information corresponding to the same is not stored in the IN buffer 121a. Even in this case (in the case of "No" at Step S151), inconsistency with the real input operation can be prevented by carrying out the operation of Step S153.

In the example of Embodiment 1 described above, the contact position on the touch panel with a greater number of pieces of contact information stored in the IN buffer 121a is determined preferentially to be a valid contact position (contact position to be output). With this configuration, the contact position to which the latest frequency of the input operation is reflected can be determined as an input position on the touch panel 10. Further, in the example in Embodiment 1 described above, in a case where a plurality of pieces of contact information are stored in the buffer area of the touch panel 100 that is referred to, contact information containing "touch start information" as the status information is selected preferentially. Thus, the contact position to which the latest input operation on the foregoing touch panel 100 is reflected can be determined as a valid contact position.

Embodiment 2

In the description of Embodiment 1 above, an example is described in which, in the valid touch checking operation, contact information of a touch panel as to which a greater number of pieces of contact information are stored in the IN buffer 121a is referred to preferentially. Alternatively, contact information of a touch panel as to which a greater number of pieces of contact information have been stored in the OUT buffer 121b in the past may be referred to preferentially. The following description describes an example of this case.

Figure 10:
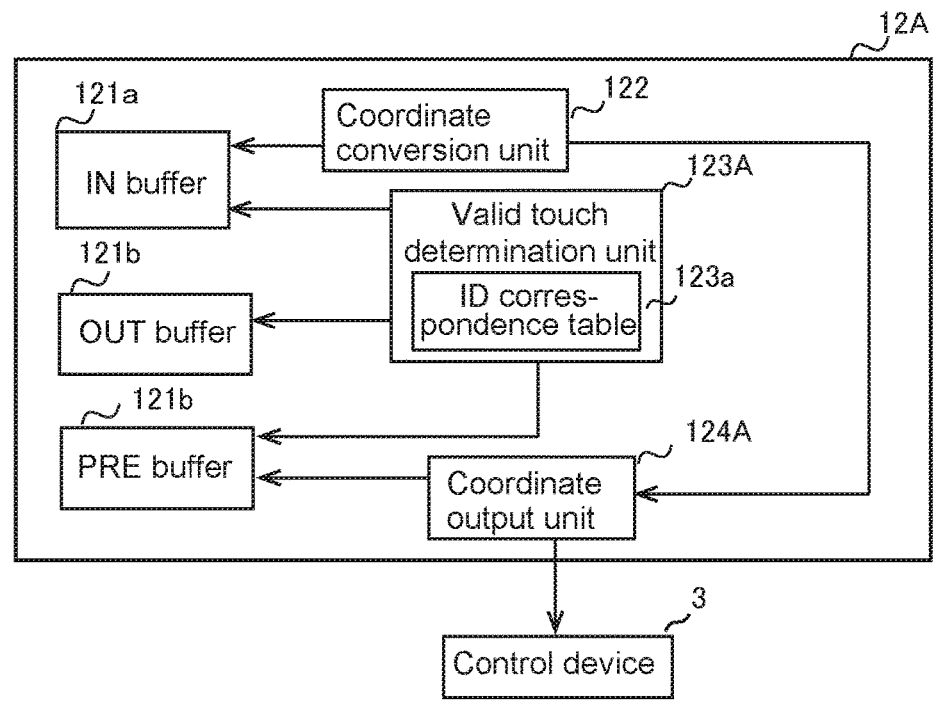
FIG. 10 is a block diagram illustrating an exemplary configuration of a coordinate output device in Embodiment 2.

FIG. 10 is a block diagram illustrating an exemplary configuration of a coordinate output device 12A in the present embodiment. In FIG. 10, configurations identical to those in Embodiment 1 are denoted by reference numerals identical to those in Embodiment 1. As illustrated in FIG. 10, the coordinate output device 12A is different from that in Embodiment 1 in the point that the same includes a valid touch determination unit 123A, a coordinate output unit 124A, and a PRE buffer 1211b. The following description describes configurations that are different from those in Embodiment 1.

Figure 11:
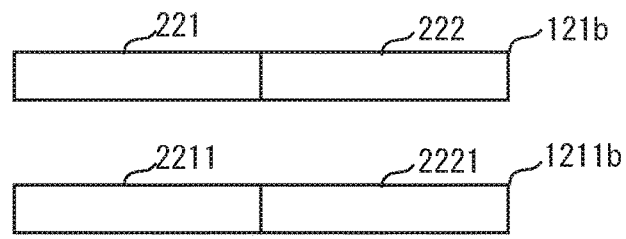
FIG. 11 is a schematic diagram illustrating exemplary configurations of an OUT buffer and a PRE buffer illustrated in FIG. 10.

FIG. 11 is a schematic diagram illustrating the OUT buffer 121b and the PRE buffer 1211b. As illustrated in FIG. 11, as is the case with the OUT buffer 121b, the PRE buffer 1211b includes two areas 2211 and 2221. In the PRE buffer 1211b, valid contact information read out of the areas 221 and 222 of the OUT buffer 121b is stored in the areas 2211 and 2221.

In FIG. 10, the valid touch determination unit 123A performs a valid touch determination operation based on the valid contact information stored in the PRE buffer 1211b. When the coordinate output unit 124 outputs input information based on the valid contact information stored in the OUT buffer 121b to the control device 3, the coordinate output unit 124 stores valid contact information in the OUT buffer 121b to the areas 2211 and 2221 of the PRE buffer 1211b.

Figure 12:
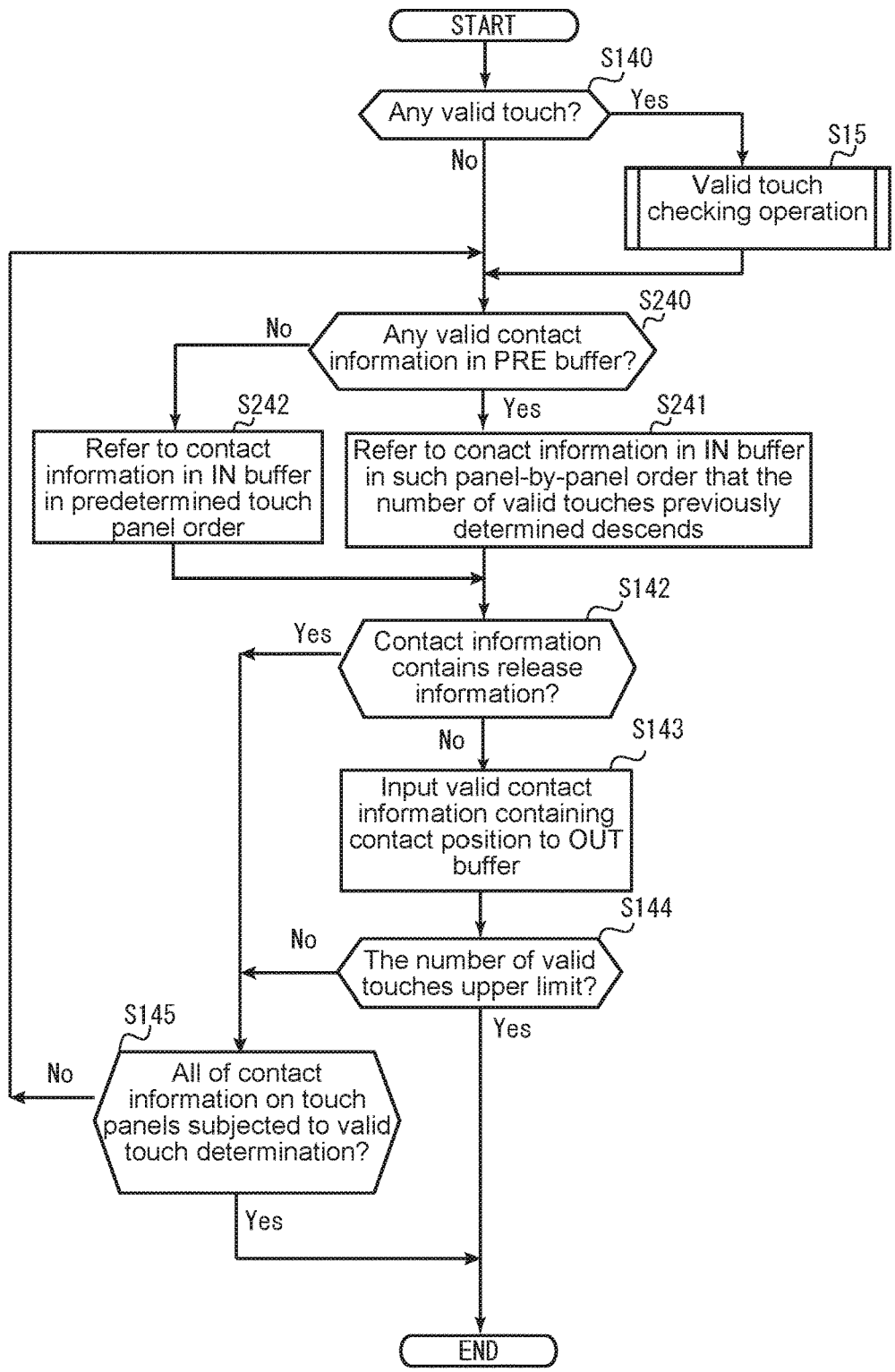
FIG. 12 is a flowchart illustrating a valid touch determination operation in Embodiment 2.

The following description describes an exemplary valid touch determination operation performed by the input device 1 in the present embodiment. FIG. 12 illustrates an operation flow of a valid touch determination operation in the present embodiment. In FIG. 12, operations identical to those in Embodiment 1 are denoted by reference numerals identical to those in Embodiment 1. Hereinafter, operations different from those in Embodiment 1 are described.

In a case where no valid contact information is stored in the areas 211 and 212 of the OUT buffer 121b (Step S140: No), the input device 1, at Step S240, determines whether valid contact information is stored in the PRE buffer 1211b. In other words, the input device 1 determines whether valid contact information containing the valid contact position determined in the previous valid touch determination operation is stored in the PRE buffer 1211b.

In a case where the valid contact information determined previously is stored in the PRE buffer 1211b (Step S240: Yes), the input device 1 refers to contact information in the IN buffer 121a, in such an order that the number of valid touches to the touch panel determined previously descends (Step S241).

Figure 13A:
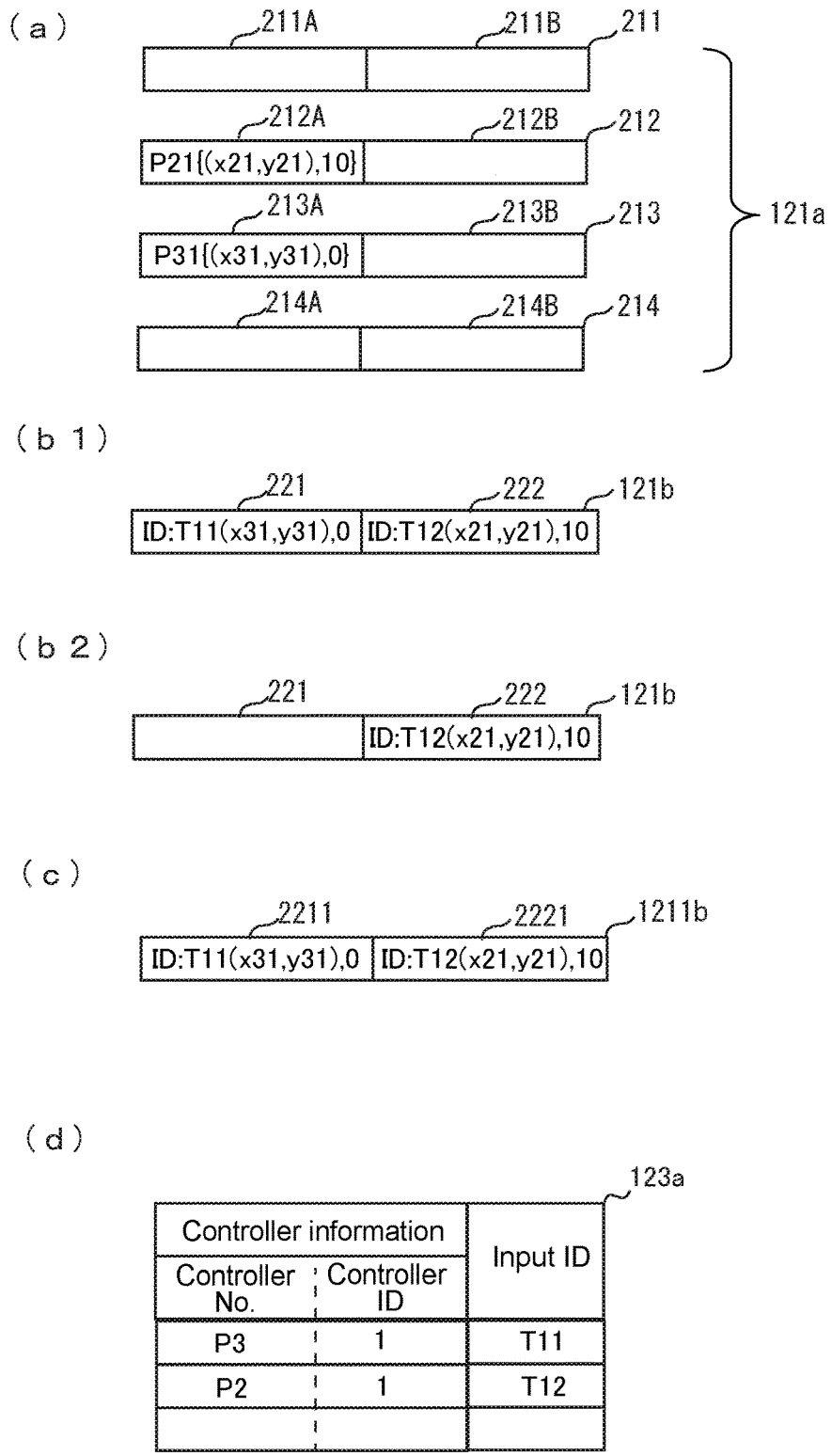
FIG. 13A illustrates exemplary data stored in an IN buffer, an OUT buffer, a PRE buffer, and an ID correspondence table in Embodiment 2.
Figure 13B:
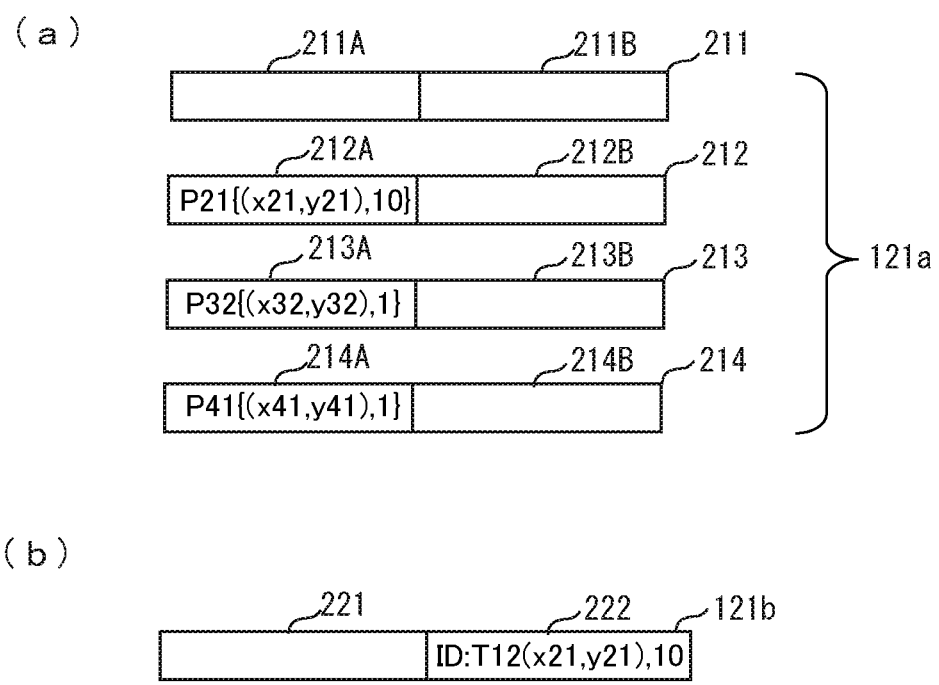
FIG. 13B illustrates exemplary data stored in the IN buffer, the OUT buffer, and the PRE buffer in Embodiment 2.

Here, a case where a transition is made in the state in the IN buffer 121a from a state illustrated in (a) of FIG. 13A to a state illustrated in (a) of FIG. 13B is described as an example.

In the buffer area 212A and the buffer area 213A of the IN buffer 121a illustrated in (a) of FIG. 13A, contact information containing a contact position of (x21, y21) and contact information containing a contact position of (x31, y31) is stored, respectively, the contact positions (x21, y21) and (x31, y31) are determined as valid contact positions.

In this state, as illustrated in (b1) of FIG. 13A, valid contact information corresponding to these is stored in the OUT buffer 121b, and as illustrated in (c) of FIG. 13A, the same valid contact information as the valid contact information stored in the OUT buffer 121b is stored in the PRE buffer 1211b. Further, as illustrated in (d) of FIG. 13A, an input ID and controller information corresponding valid contact information illustrated in (b1) of FIG. 13A are stored in the ID correspondence table 123a. In the valid contact information stored in the area 221 of the OUT buffer 121b illustrated in (b1) of FIG. 13A, release information is contained. After input information based on this valid contact information is output to the control device 3, therefore, this valid contact information is deleted from the area 221, and the OUT buffer 121b makes a transition to a state illustrated in (b2) of FIG. 13A.

The state of the IN buffer 121a illustrated in (a) of FIG. 13B is a state in which, in place of the contact information of "P31{(x31, y31), 0}", contact information of "P32{(x32, y32), 1}" is stored in the area 213A of the buffer area 213, and contact information of "P41{(x41, y41), 1}" is stored in the area 214A of the buffer area 214.

At this point of time, as illustrated in (b2) of FIG. 13A, whereas valid contact information is stored in the area 222 of the OUT buffer 121b, no valid contact information is stored in the area 221. In this case, the input device 1 first carries out a valid touch checking operation with respect to the valid contact information stored in the area 222, as is the case with Embodiment 1 described above (Step S140: Yes, Step S15).

The input device 1 refers to the ID correspondence table 123a illustrated in (d) of FIG. 13A. The input ID of the valid contact information illustrated stored in the area 222 of the OUT buffer 121b illustrated in (b2) of in FIG. 13A is "T12". In the buffer area 212A illustrated in (a) of FIG. 13B, contact information containing the controller information of "P21" corresponding to the input ID of "T12" is stored. The input device 1, therefore, updates valid contact information stored in the area 222, based on the contact information stored in the buffer area 212A. Consequently, as illustrated in (b) of FIG. 13B, valid contact information containing the hold information of "10" is stored in the area 222.

In FIG. 12, after the valid touch checking operation (Step S15), in a case where valid contact information is stored in the PRE buffer 1211b (Step S240: Yes), the input device 1 refers to the IN buffer 121a in such an order that the number of valid touches to the touch panel stored in the PRE buffer 1211b descends (Step S241).

As illustrated in (c) of FIG. 13A, valid contact information obtained by the previous valid touch determination operation is stored in the area 2211 and the area 2221 of the PRE buffer 1211b. The input ID of "T12" of the valid contact information stored in the area 2221 is stored in the area 222 of the OUT buffer 121b illustrated in (b) of FIG. 13B, and has been determined as a valid touch already. The input device 1, therefore, in the IN buffer 121a, preferentially refers to contact information of the touch panel corresponding to the valid contact information stored in the area 2211 illustrated in (c) of FIG. 13A. The input ID included in the valid contact information stored in the area 2211 is "T11", and according to the ID correspondence table 123a, the controller No. corresponding to the input ID of "T11" is "P3". In the present example, therefore, contact information in the buffer area 213 corresponding to the controller No. of "P3" is referred to.

In the area 213A in the buffer area 213 illustrated in (a) of FIG. 13B, the contact information of "P32{(x32, y32), 1}"

is stored. Since no release information is included in the contact information (Step S142: No), the input device 1 determines the contact position of (x32, y32) of the contact information as a valid contact position. Then, the input device 1 stores valid contact information containing this contact position, a new input ID of "T13", and touch start information of "1" in the area 221 of the OUT buffer 121*b* (Step S143).

Figure 13C:
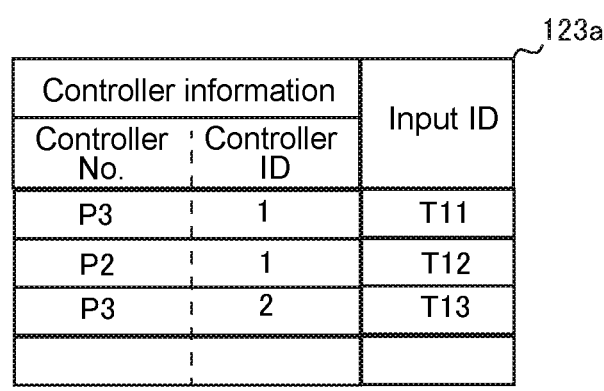
FIG. 13C illustrates exemplary data stored in the OUT buffer and the ID correspondence table in Embodiment 2.
Figure 13C:

In this way, as illustrated in (a) of FIG. 13C, the input ID of "T13" and the controller information of "P32" are stored in correspondence with each other in the ID correspondence table 123*a*, and as illustrated in (b) of FIG. 13C, the pieces of valid contact information are stored in the areas 221 and 222 of the OUT buffer 121*b*, respectively. Then, input information based on the valid contact information stored in the areas 221 and 222 of the OUT buffer 121*b* is output to the control device 3, and thereafter, these pieces of valid contact information are stored in the PRE buffer 1211*b* (not shown).

In Embodiment 2 described above, a contact position of a touch panel with a greater number of pieces of valid contact information stored in the PRE buffer 1211*b* is preferentially determined as a valid contact position. Therefore, a contact position to which the frequency of the input operation determined previously is reflected can be determined as an input position on the touch panel 10. In the example of Embodiment 2, there is only one touch panel with a greater number of pieces of valid contact information determined previously, but in a case where there are a plurality of the same, for example, the contact information of the touch panels may be referred to in a preliminarily set order, or contact information containing "touch start information" may be preferentially referred to.

The embodiments of the present invention are described above, but the above-described embodiments are merely examples for implementing the present invention. The present invention, therefore, is not limited to the above-described embodiments, and the above-described embodiments can be appropriately varied and implemented without departing from the scope of the invention. Hereinafter, modification examples of the present invention are described.

<Modification>

(1) In the descriptions of Embodiments 1 and 2 above, an example is described in which at most two input operations are detected on the first to fourth touch panels 101 to 104, and at most two input operations are determined on the touch panel 10, but alternatively the configuration may be as follows. The number of input operations detectable on each of the first to fourth touch panels 101 to 104 may be 1 or greater, and the upper limit number of input operations on the touch panel 10 may be less than a sum of the numbers of input operations on the respective touch panels.

(2) In Embodiments 1 and 2 described above, the input device 1 in which four touch panels, i.e., the first to fourth touch panels 101 to 104, are arranged so as to be adjacent to one another is used as an example, but the touch panels arranged so as to be adjacent to one another may be at least two in number.

(3) In the description of Embodiment 2 above, an example is described in which the buffer area of the IN buffer 121*a* for the touch panel with a greater number of pieces of valid contact information determined previously is referred to preferentially, but alternatively the configuration may be as follows, for example: the buffer areas of the IN buffer 121*a* may be referred to in such an order that the number of pieces of valid contact information determined in n determination operations in the past (n is a natural number, n≥2) descends. In this case, the configuration may be such that a PRE buffer 1211*b* for storing the valid contact information detected in the n operations in the past is provided.

(4) In the descriptions of Embodiments 1 and 2 above, an example is described in which in the input device 1, a valid contact position (contact position to be output) is converted to synthesized coordinates on a coordinate plane of the touch panel 10, but the conversion may be performed in the control device 3. For example, the configuration may be as follows: the input device 1 outputs contact information of a valid contact position as input information to the control device 3, and in the control device 3, the contact position is converted to synthesized coordinates by using a conversion formula, a conversion table, or the like for converting contact positions on each touch panel to synthesized coordinates.

The invention claimed is:

1. An input device having a plurality of touch panels arranged so as to be adjacent to one another, to output a predetermined number of contact positions, among contact positions corresponding to input operations detected at fixed time intervals on each of the plurality of touch panels, the input device comprising:
    a specification unit that, based on contact positions corresponding to the input operations detected at fixed time intervals, specifies frequencies of the input operations with respect to the touch panels; and
    a determination unit that, among the contact positions corresponding to the input operations detected at fixed time intervals, preferentially determines the contact position on the touch panel with a greater frequency of the input operation as a contact position to be output,
    wherein the predetermined number is less than a sum of respective numbers of the contact positions of the input operations detectable during the fixed time interval on the respective touch panels.

2. The input device according to claim 1, further comprising:
    a storage unit configured to store the contact position to be output,
    wherein, based on the contact positions to be output stored in the storage unit, as to each of the touch panels, the specification unit counts the number of contact positions to be output on the touch panel, and
    the determination unit preferentially determines the contact position on the touch panel with a greater number of contact positions to be output, as the contact position to be output.

3. The input device according to claim 1, wherein,
    based on the contact positions corresponding to the input operations detected at fixed time intervals, as to each of the touch panels, the specification unit counts the number of contact positions on the touch panel, and
    the determination unit preferentially determines the contact position on the touch panel with a greater number of contact positions, as the contact position to be output.

4. The input device according to claim 1, wherein, among the contact positions corresponding to the input operations detected during the fixed time interval, as to each of the touch panels, the determination unit determines the contact position to be output, according to the contact position corresponding to the input operation detected last.

5. A non-transitory computer readable storage medium with a control program stored thereon, the control program causing a processor of a computer of an input device that outputs a predetermined number of contact positions, among contact positions corresponding to input operations detected at fixed time intervals on each of a plurality of touch panels arranged so as to be adjacent to one another, to execute the steps of:

based on contact positions corresponding to the input operations detected at fixed time intervals, specifying frequencies of the input operations with respect to the touch panels; and among the contact positions corresponding to the input operations detected at fixed time intervals, preferentially determining the contact position on the touch panel with a greater frequency of the input operation as a contact position to be output, wherein the predetermined number is less than a sum of respective numbers of the contact positions of the input operations detectable during the fixed time interval on the respective touch panels.

\* \* \* \* \*